United States Patent [19]

Voellmer

[11] Patent Number: 5,174,694

[45] Date of Patent: Dec. 29, 1992

[54] RETRACTABLE TOOL BIT HAVING SLIDER TYPE CATCH MECHANISM

[75] Inventor: George M. Voellmer, Takoma Park, Md.

[73] Assignee: The United States of America as represented by the Administrator of the National Aeronautics & Space Administration, Washington, D.C.

[21] Appl. No.: 765,069

[22] Filed: Sep. 24, 1991

[51] Int. Cl.⁵ .................................. B23B 31/10
[52] U.S. Cl. .................................. 408/124; 279/79; 279/89; 408/239 R; 408/241 R; 901/41
[58] Field of Search .................. 483/901; 901/41; 408/124, 226, 238, 239 R, 241 R; 279/24, 29, 46.7, 79, 89, 93, 906

[56] References Cited

U.S. PATENT DOCUMENTS

| | | | |
|---|---|---|---|
| 1,259,603 | 3/1918 | Conord | 279/79 |
| 1,802,053 | 4/1931 | Halborg | 279/79 |
| 1,809,273 | 6/1931 | Halborg | 279/79 |
| 2,324,852 | 7/1943 | Kopczynski | 279/79 |
| 2,716,393 | 8/1955 | Fischer | |
| 2,906,144 | 9/1959 | McManis | 408/124 |
| 3,762,264 | 10/1973 | Scott | 279/89 |
| 3,796,464 | 3/1974 | Hansen et al. | |
| 4,520,550 | 6/1985 | Dunn et al. | |
| 4,662,771 | 5/1987 | Roe et al. | |
| 4,826,230 | 5/1989 | Fruchet | 279/79 |

Primary Examiner—Daniel W. Howell
Attorney, Agent, or Firm—R. Dennis Marchant; Guy M. Miller; Paul S. Clohan, Jr.

[57] ABSTRACT

A retractable tool bit assembly utilized in conenction with a robotic gripper type and end-effector. The apparatus includes one or more spring loaded nestable or telescoping tubular sections together with a catch mechanism for capturing and holding the tool, such as an allen key, in its retracted position. The innermost tubular section includes a threshold cap and engages and holds the tool. The catch mechanism consists of a slider type mechanism located adjacent a relatively larger outer base sction and includes means for engaging a conically or mushroom shaped rear end portion of the tool when the telescoping sections are moved to a retracted or parked position. The catch mechanism is released upon actuation of a rotary tool drive motor coupled to a circular mount and which holds the base section. When released all the telescoping sections including the tool extends fully outward to a use position.

17 Claims, 3 Drawing Sheets

RETRACTABLE TOOL BIT HAVING SLIDER TYPE CATCH MECHANISM

This invention was made by an employee of the United States Government and therefore may be used by and for the Government for governmental purposes without the payment of any royalties thereon or therefor.

CROSS REFERENCE TO RELATED APPLICATION

This application is related to U.S. Ser. No. 07 656,924, (GSC13-370-1) entitled, "Split Rail Gripper Assembly and Tool Driver Therefor", which was filed in the name of George M. Voellmer on the twelfth day of Feb., 1991, and Which is also assigned to the assignee of this invention.

FIELD OF THE INVENTION

This invention relates generally to a motor driven rotatable tool bit and more particularly to a telescoping retractable tool bit assembly driven by a rotary motor used in connection with apparatus for robotically gripping objects.

BACKGROUND OF THE INVENTION

Where there is a need to position and remotely control machinery with a high degree of precision, robots are often used to perform these tasks. Robots in the past have been utilized to perform both simple and complex tasks in various environments, particularly where human activity is inaccessible, prohibited, or relatively hazardous. More recently, robotic type apparatus has been put to use in outer space. Typically where such robots are used, end-effectors are attached to movable robot arms so that objects can be grasped, lifted, manipulated or otherwise operated upon.

In the above cross-referenced related application there is described an end-effector comprised of a split rail gripper assembly comprised of a pair of outwardly extending finger assemblies attached to respective ends of a rack and pinion gear type of rail assembly which is activated by an acme screw driven by a motorized unit coupled to a harmonic drive gear reduction mechanism. Between the outward extending finger assemblies there is located a retractable tool bit for an allen key type tool which forms the subject matter of this invention.

SUMMARY

Accordingly, it is an object of the present to provide an improvement in rotatable tool drive apparatus.

It is another object of the invention to provide an improvement in a retractable tool bit.

It is a further object of the invention to provide an improvement in a motor driven retractable tool bit.

And it is yet another object of the invention to provide a retracted tool bit which remains in a retracted state until required in order to economize the work space into which the tool bit would otherwise protrude.

And still a further object of the invention is to provide a motor driven retractable tool bit assembly used in connection with a robotic gripper assembly.

Briefly, the foregoing and other objects are achieved by a retractable tool bit assembly for a tool such as an allen key and comprising one or more spring loaded nestable or telescoping tubular sections together with a catch mechanism for capturing and holding the tool in its retracted position. The smaller inner tubular section includes a threaded cap which engages and holds the tool. The catch mechanism consists of a slider type mechanism located adjacent a base section and includes means for engaging the conically shaped inner end portion or head of the tool when the telescoping sections are moved to a retracted or parked position. The catch mechanism is released upon actuation of a rotary tool drive motor coupled to a circular mount and which holds the base section. When released all the telescoping sections and the tool extends fully outward to a use position.

BRIEF DESCRIPTION OF THE DRAWINGS

Other features, advantages and objectives of the invention will be more readily apparent when the following detailed description of the invention is considered in conjunction with the accompanying drawings, wherein.

DETAILED DESCRIPTION OF THE INVENTION

Figure 1:
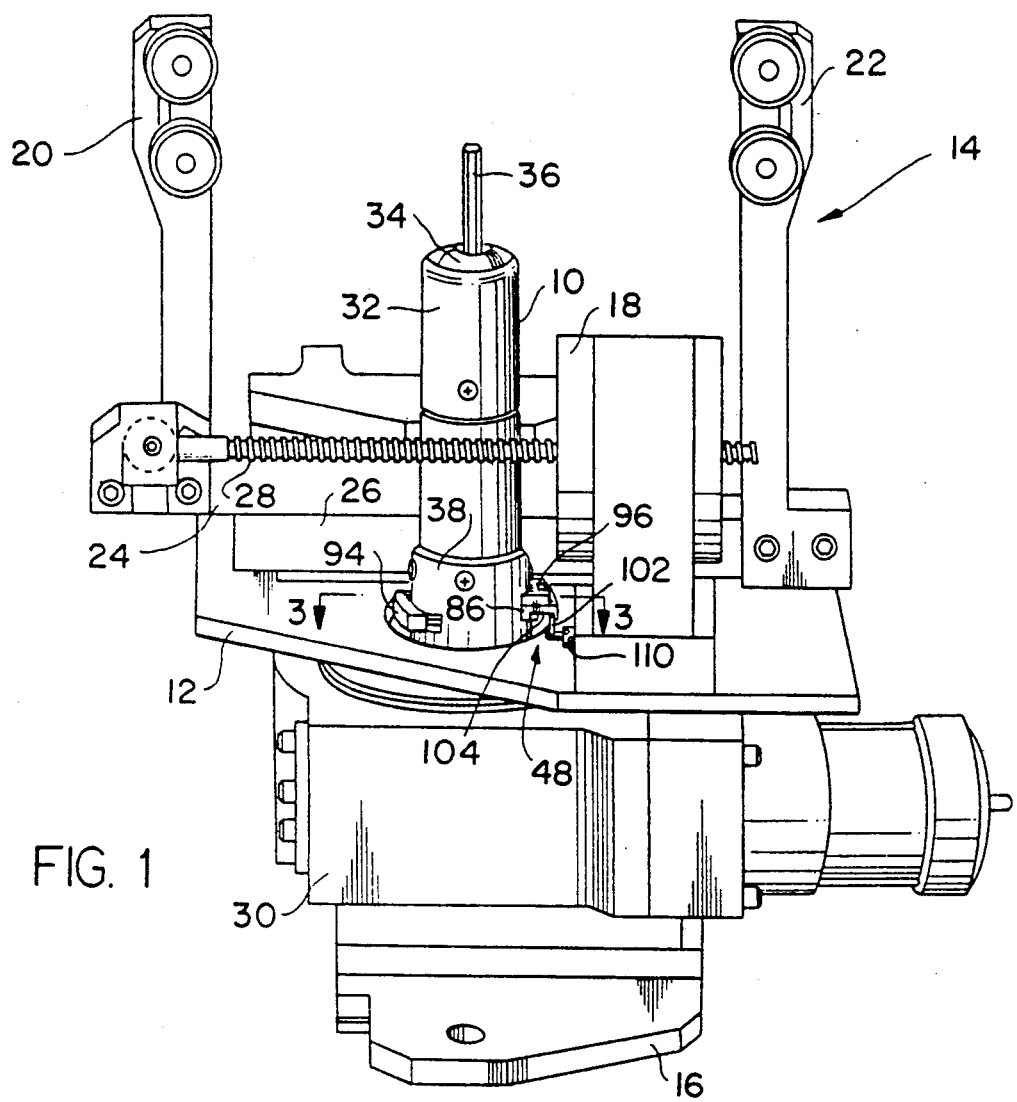
FIG. 1 is a perspective view generally illustrative of a split rail gripper assembly upon which the preferred embodiment of the invention is mounted.
Figure 2:
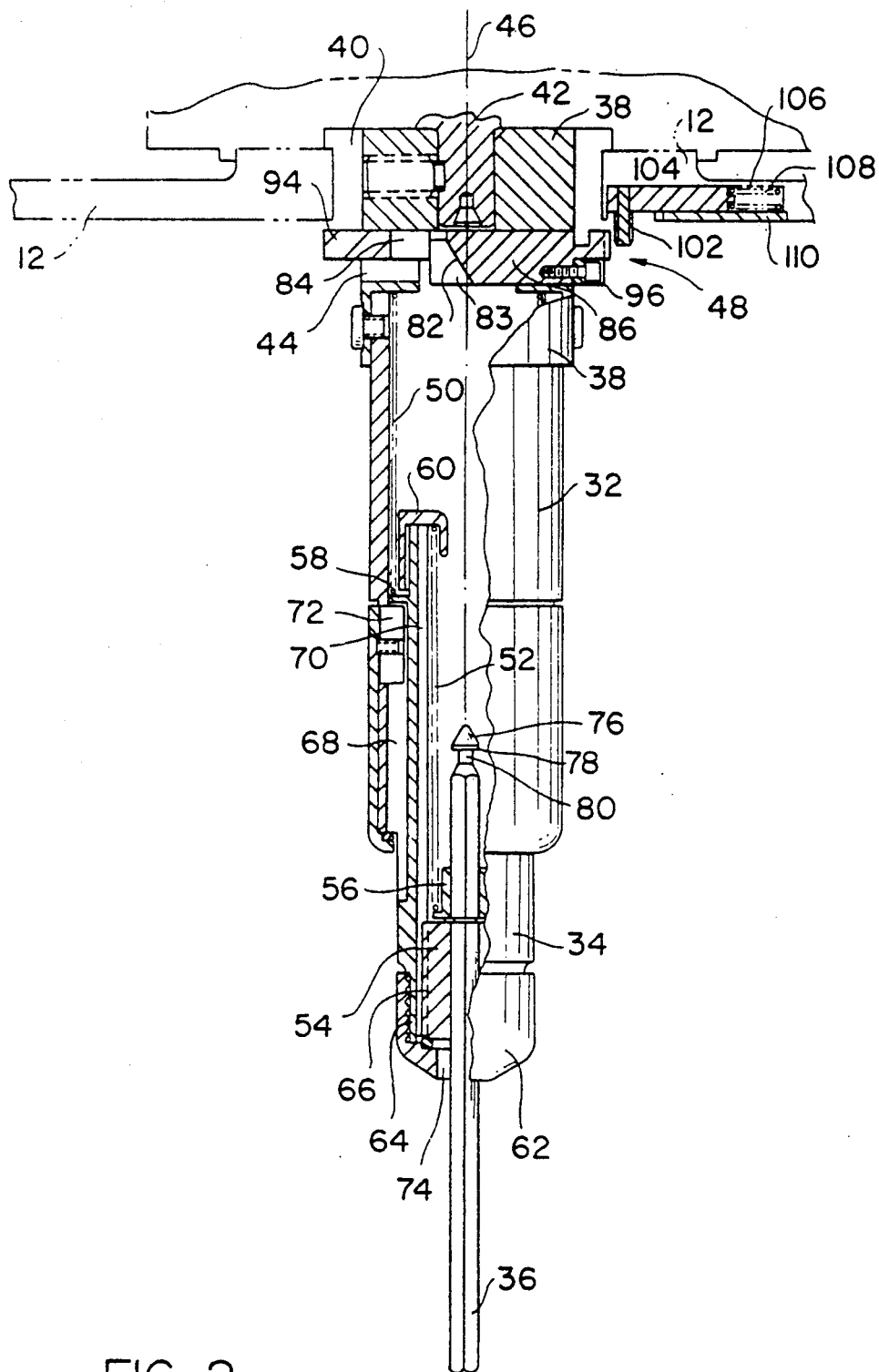
FIG. 2 is a partially cut away central longitudinal cross section of the preferred embodiment of the invention shown in FIG. 1.
Figure 4A:
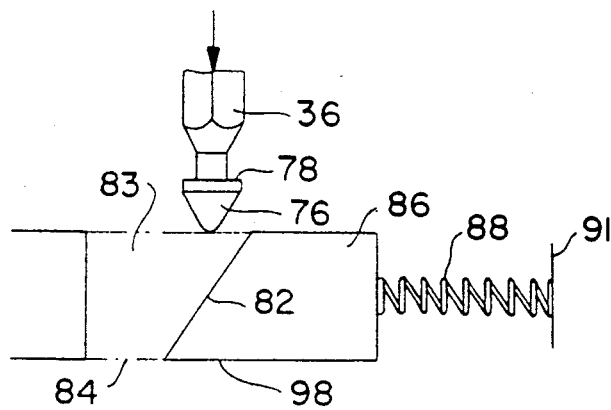
FIGS. 4A-4D are schematic diagrams illustrative of the operation of the catch mechanism in capturing the end of the tool when the tool bit assembly as shown in FIG. 2 is retracted.
Figure 4B:
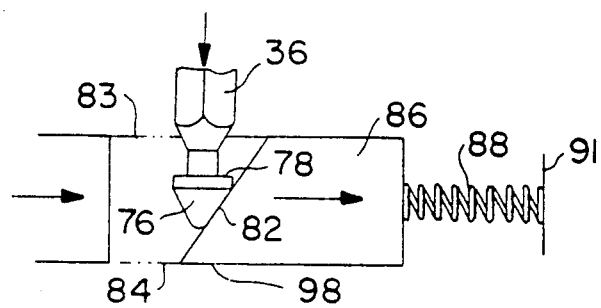
Figure 4C:
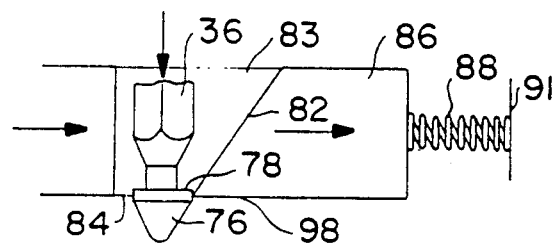
Figure 4D:
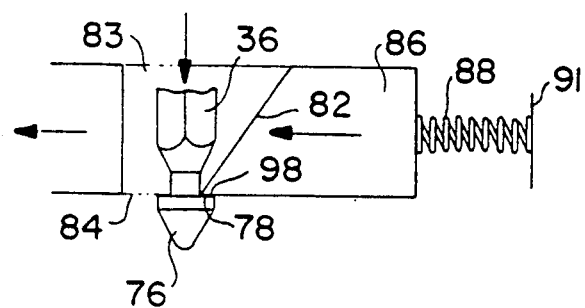

Referring now to the drawings wherein like reference numerals refer to like parts throughout, reference will first be made to FIG. 1 wherein there is shown a tool bit assembly 10, the details of which are shown in FIG. 2, mounted on the base plate 12 of a split rail gripper assembly 14. The gripper assembly 14 is disclosed in detail in the above-referenced related application and is intended to be specifically incorporated herein by reference. In FIG. 1, the gripper assembly 14 comprises an end-effector for a robotic arm, not shown, and includes, among other things, a robotic arm interface plate 16, an electrical drive motor sub-assembly 18 which drives a pair of outwardly extending roller mounted finger elements 20 and 22. The finger elements 20 and 22 are respectively secured to two elongated rails 24 and 26 mutually interconnected by a rack and pinion mechanism, not show. The two rails 24 and 26 move in mutually opposite directions by means of an elongated Acme screw 28 which is coupled to one of the finger elements and more particularly to element 20, and which is linearly driven through the motor assembly 18 which is shown mounted on the base plate 12.

In FIG. 1 the tool bit 10 according to this invention is shown in the retracted or parked position, while in FIG. 2 it is shown in the extended or use position. Referring now to FIG. 2, the preferred embodiment of the invention is shown in detail comprising two mutually telescoping tubular sections 32 and 34, with the outer larger section 32 comprising a base section, and the smaller inner section comprising an extension section which is adapted to hold an elongated tool member 36 in the form of a well known allen key, which is adapted to engage a like type socket, not shown.

The base section 32 is mounted in and bolted to a rotatable circular mount 38 which extends through an aperture 40 in the gripper base plate 12. The mount 38 is fastened to the shaft 42 of a drive motor, not shown, located in the motor sub-assembly 30 (FIG. 1). The mount 38, moreover, includes a slot 44 transverse to a central longitudinal axis 46 in which there is located a slider type catch mechanism 48, the details of which will be discussed subsequently.

The tool 36 and the extension section 34 are spring loaded, i.e. biased, by means of a pair of axially extending compression springs 50 and 52 located within the tubular base section 32 and extension section 34. The tool 36 includes a ferrule 54 along its length which abuts a metal cap member 56 so that the compression spring 52 compresses and expands against the cap member 56 while the compression spring 50 compresses and expands against a shoulder 58 formed on the lower half of the extension section 34. A threaded end cap 62 is affixed to a threaded outer end portion 64 of the extension section 34.

It can be seen that both the tool 36 and the inner extension section 34 are retractable against the bias of the spring members 50 and 52. Both the ferrule 54 and the extension section 34 additionally include linear keyway grooves 66 and 68 on their outer surfaces which engage key members 70 and 72 on the extension section 64 and the base section 32, respectively, to permit both the extension section 34 and the tool tip 36 to move axially and not spirally when extending and for transmitting torque to the driven element, not shown, engaging the tip of the tool 36.

Although one extension section 34 is shown in connection with the base section 32, this section can be deleted when desired or a plurality of progressively smaller extension sections 34 can be implemented in combination with the base section 32. It should also be noted that the tool 36 has a relatively loose fit in the outer extension section 34 and through the axial opening 74 in the end cap 62 in order to allow the tool 36 a certain amount of lateral compliance. This is due to the fact that since the desired application of this invention is in robotics, small amounts of compliance are important, although it is not essential for the operation of the invention.

Figure 3:
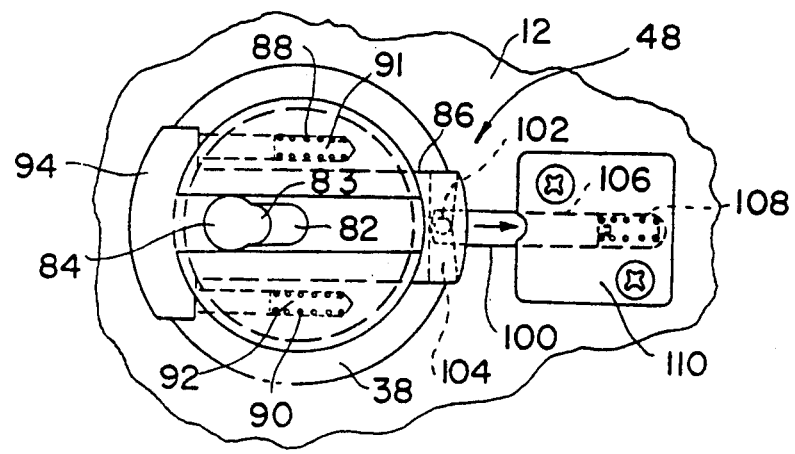
FIG. 3 is a sectional view taken along the lines 3—3 of FIG. 1 and being illustrative of the catch mechanism for holding and releasing the spring loaded tool when in the retracted or parked position.

This now leads to a consideration of the catch mechanism 48 located in the rotatable mount 38. First it should be noted that the back end of the tool 36 as shown in FIG. 2 includes a circular conical or mushroom shaped head 76 which has a flat rear shoulder surface 78 which attaches to a reduced diameter neck portion 80. When the tool 36 is compressed inwardly, it first engages the inner wall surface 82 of a tapered hole 83 formed in a spring biased block member 86 which terminates in a circular aperture 84. The block member 86 is adapted to slide in and out of the slot 44 against the bias applied by a pair of small compression springs 88 and 90 as shown in FIG. 3 located in a pair of small bores 91 and 92 and which operate against the rounded end piece 94. At the other end of the block 86 there is located a stop member 96 (FIG. 1) which restrains the block 86 from being pushed completely out of the slot 44 by the bias springs 88 and 90.

As now shown by the sequence of FIGS. 4A-4D, as the tool 36 approaches the block 86 when it is being urged toward a retracted position, the conical head 76 contacts the inner wall surface 82 of the tapered hole until it projects through the aperture 84, at which time the bottom lip 98 (FIG. 4D) of the block 86 captures the rear shoulder surface 78. The bias of the axial spring 52 (FIG. 2) in the extension section 34 thereafter exerts a pulling force on the tool 36 but it is restrained from axial further movement by the lip 98.

As best shown in FIG. 2 as well as FIGS. 4A-4D, the head 76 of the tool 36 is thereafter released upon rotation of the motor driven mount 38 by a spring biased finger mechanism 100 mounted on the gripper plate 12 adjacent the slidable block 86. The release mechanism 100 is comprised of a relatively small outwardly protruding finger 102 which is adapted to engage an angulated cam follower type groove 104 formed in the underside of the outer end portion of the block 86 adjacent the finger 102. As the block 86 is rotated along with the motor driven mount 36, the finger 102 engages the slot 104 to move the block inwardly to the right so that the aperture 84 moves toward the central axis 46 (FIG. 1) until it is in registration with the head 76 of the tool 36, permitting it to disengage from the lip 98 and spring forward. This then causes both the tool 36 and the extension section 34 to fully extend to a use position from the base section 32.

In the event that the finger 102 is caught outside of the cam follower groove 104 during retraction of the tool bit 76, it is also slidable in a bore 106, located in the base plate 12, in a direction away from the block 86 while being biased inwardly by means of a small bias spring 108. A small cover member 110 keeps the parts in place.

When the tool 36 is no longer needed for use, the tool tip is placed in a shallow cup, not shown, and the tool 36 is compressed axially until all of the telescoping sections are compressed and the head 76 of the tool again engages the catch mechanism 48 in the bottom of the tool bit. The catch mechanism 48 engages the tool end 36, keeping the tool 36 fully retracted until it is subsequently released by rotation of the drive motor.

Having thus shown and described what is at present considered to be the preferred embodiment of the invention, it should be noted that the same has been made by way of illustration and not limitation. Accordingly, all alterations, changes and modifications coming within the spirit and scope of the invention as set forth in the appended claims are herein meant to be included.

I claim:

1. A retractable tool bit assembly comprising:
   at least one rotatable outwardly protruding tool bit holder section;
   an elongated spring biased tool mounted for axial movement in and out of said holder section and having an inwardly retracted parked position and an outwardly extended use position, said tool further including a back end having a grippable rear end portion;
   a slider type catch mechanism located adjacent the tool bit holder section and including means for engaging said end portion of said tool when said tool is moved to said parked position and means for releasing said end portion upon rotational movement of said section whereupon said spring biased tool extends fully outward to said use position.

2. A retractable tool bit assembly comprising:
   a rotatable outwardly protruding base section;
   at least one coaxial spring biased telescoping extension section mounted for axial movement in and out of said base section;

an elongated spring biased tool mounted for axial movement in and out of said extension section and having an inwardly retracted parked position and an outwardly extended use position, said tool further including an inner end having a grippable end portion;

a slider type catch mechanism located adjacent the base section and including means for engaging said end portion of said tool when said telescoping extension section and said tool are moved to said parked position and means for releasing said end portion upon rotational movement of said base section whereupon said spring biased tool extends fully outward to said use position.

3. The tool bit assembly as defined by claim 2 wherein said means for engaging said end portion of said tool includes a spring biased block member rotatable with said base section and orthogonally translatable relative to a central longitudinal axis of said base section and said extension section and having an aperture offset from said axis for receiving and engaging said end portion, whereby inward movement of said tool causes said spring biased block member to slide sideways in response to contact with said end portion until said end portion extends into said aperture, said block member thereafter reversing direction and capturing said end portion until released by a subsequent rotation of said base section.

4. The tool bit assembly as defined by claim 3 wherein said means for releasing includes means for sliding said spring biased block member in a direction to bring said aperture into alignment with said central longitudinal axis in response to rotation of said base portion whereby the end portion of the spring loaded tool is freed and said tool and said extension section thereafter assume a fully extended use position.

5. The tool bit assembly as defined by claim 4 wherein said means for sliding said block member includes cam follower means located in an end portion of said block member away from said aperture and cam means engageable with said cam follower means located adjacent said block member, whereby rotational movement of the base section results in said cam means translating the block member and the aperture therein into alignment with said central longitudinal axis to release said tool.

6. The tool bit assembly as defined by claim 5 wherein said cam follower means comprises an angulated slot formed in said end portion of said block member.

7. The tool bit assembly as defined by claim 6 wherein said cam means comprises a finger member engageable within said slot.

8. The tool bit assembly as defined by claim 7 wherein said finger member comprises a spring biased outwardly extending finger member.

9. The tool bit assembly as defined by claim 5 wherein said tool and said extension section include means for linearly extending outward to and from said use position.

10. The tool bit assembly as defined by claim 9 wherein said means for linearly extending comprises a keyed linear slot located on an inside surface of said base section and said extension section and a keyed surface member and an outer surface of said extension section and said tool for respectively engaging said slots in said base section and said extension section.

11. The tool bit assembly as defined by claim 10 and additionally including a rotatably driven seat member supporting said base section and including a passage therein transverse to said central longitudinal axis supporting said spring biased block member.

12. The tool bit assembly as defined by claim 11 wherein said seat member is located in a base plate of a robotic gripper.

13. The tool bit assembly as defined by claim 11 and additionally including an outer cap member secured to extension section and having a central opening for the passage of said tool therethrough.

14. The tool bit assembly as defined by claim 11 wherein said grippable end portion of said tool comprises a conically shaped tip.

15. The tool bit assembly as defined by claim 14 wherein said conically shaped tip includes a flat rear end surface transverse to said central longitudinal axis for being engaged by said spring biased block member.

16. The tool bit assembly as defined by claim 11 wherein said base section and said at least one extension section are generally circular in cross section.

17. The tool bit assembly as defined by claim 11 wherein said tool comprises an allen key type member.

* * * * *